Sept. 13, 1949.  L. STANTON  2,481,485
METHOD AND APPARATUS FOR MEASURING AND CONTROLLING Filed May 11, 1946  5 Sheets-Sheet 1

INVENTOR,
LEONARD STANTON

BY Arthur H. Swanson
ATTORNEY.

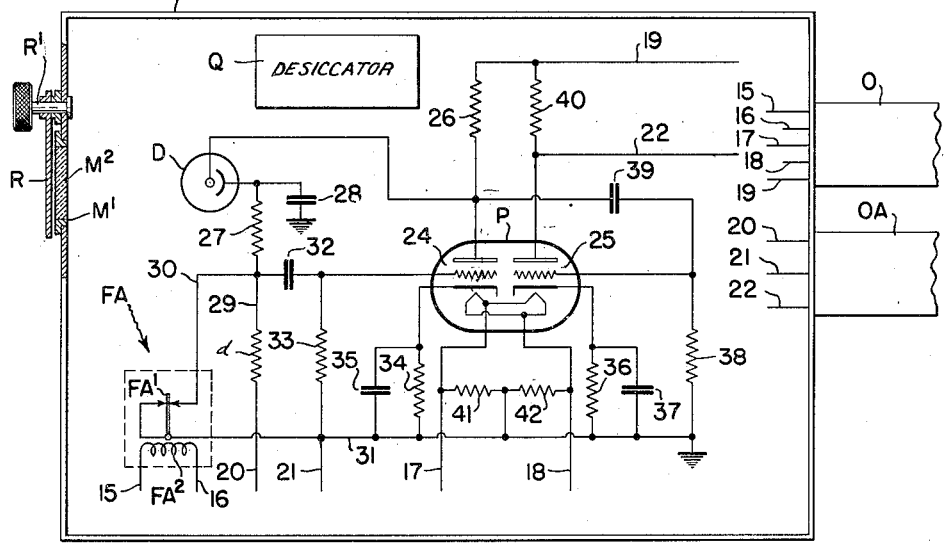

Sept. 13, 1949.　　　　　L. STANTON　　　　　2,481,485
METHOD AND APPARATUS FOR MEASURING AND CONTROLLING
Filed May 11, 1946　　　　　　　　　　　　　5 Sheets-Sheet 3

*INVENTOR.*
LEONARD STANTON
BY Arthur H. Swanson
ATTORNEY.

INVENTOR.
LEONARD STANTON
BY Arthur H. Swanson
ATTORNEY.

INVENTOR.
LEONARD STANTON

BY Arthur H. Swanson
ATTORNEY.

Patented Sept. 13, 1949

2,481,485

UNITED STATES PATENT OFFICE 2,481,485

METHOD AND APPARATUS FOR MEASURING AND CONTROLLING

Leonard Stanton, Philadelphia, Pa., assignor, by mesne assignments, to Minneapolis-Honeywell Regulator Company, Minneapolis, Minn., a corporation of Delaware Application May 11, 1946, Serial No. 669,016

35 Claims. (Cl. 250—41.5)

The general object of the present invention is to provide an improved method of and apparatus for measuring minute electric currents, and particularly currents flowing in high impedance circuits and of a magnitude which may be as small as a fraction of a micromicroampere. A more specific object of the invention is to provide an improved ultra-violet recording spectrophotometer for use in the chemical industry in identifying and analyzing chemical compounds and mixtures.

Further specific objects of the invention are to eliminate or materially minimize certain objectionable noise and drift characteristics of prior ultra-violet spectrophotometer apparatus, and other apparatus including electronic amplifying means, heretofore used in measuring minute electric currents flowing in high impedance circuits.

A primary object of the invention is to provide a simple and effective self balancing method of and apparatus for measuring minute currents which comprises a multistage electronic amplifying system and measuring circuit arrangements permitting complete alternating current control of the operation of each amplifying stage and thus avoiding the pronounced drift tendency experienced in the electronic amplification of minute D. C. currents.

Another primary object of the invention is to provide a method of and apparatus for measuring and amplifying currents in which a standard type triode valve tube is used as an electrometer tube, and in which objectionable results of noise effects and fluctuations in the plate circuit supply voltage are minimized by operating the tube with grid current and plate and filament heating voltage values much below their normal or rated values in such a tube.

More particularly, the invention has for its object to provide self balancing measuring apparatus comprising means normally maintaining a potential drop in a low resistance potentiometer slide wire which is equal to the potential drop due to the flow through a high resistance of a minute unidirectional current, and comprising means including a converter for maintaining an alternating current proportional to the differential between said potential drops when they are unequal, and comprising means effective to amplify said alternating current and to utilize the amplified current in relatively adjusting the slide wire and associated contact to eliminate said differential and in operating recording or other exhibiting apparatus and, when desirable, in operating control apparatus. In the practical use of the invention, the frequency of the alternating current maintained by the converter is usually sixty cycles.

Another object of the invention is to provide such operative circuit connections to a converter of the vibrator type employed to convert the unidirectional current into alternating current, as to make it unnecessary to shield or insulate the vibrator element of the converter.

Another object of the invention is to provide a measuring system including electronic amplifying means, with a novel electrometer tube circuit which is adapted to give one or more, and preferably all of the following desirable results: (a) voltage regulation; (b) a reduction in grid current thereby effecting a reduction in microphonic signals; (c) a reduction in the effective ripple due to the heater filament circuit; and (d) the use of a simple triode as an electrometer tube, in lieu of the tetrode electrometer tubes heretofore employed in the measurement of minute currents.

Another object of the invention is to effect simple modifications in the amplifying and control apparatus of a commercially standardized type included in the well known and extensively used conversion type, continuously operating potentiometer, so as to adapt thereby such standard apparatus for effective use in the practice of the present invention.

The various features of novelty which characterize my invention are pointed out with particularity in the claims annexed to and forming a part of this specification. For a better understanding of the invention, however, its advantages, and specific objects attained by its use, reference should be had to the accompanying drawings and descriptive matter in which I have illustrated and described preferred embodiments of the invention.

Of the drawings:

Fig. 2 is a diagram showing circuit features of the preamplifier section of apparatus differing specifically from the apparatus shown in Fig. 1;

Figs. 4, 5 and 6 are diagrams, each showing a different modification of the converter and preamplifier arrangement shown in Fig. 2;

Figure 1:
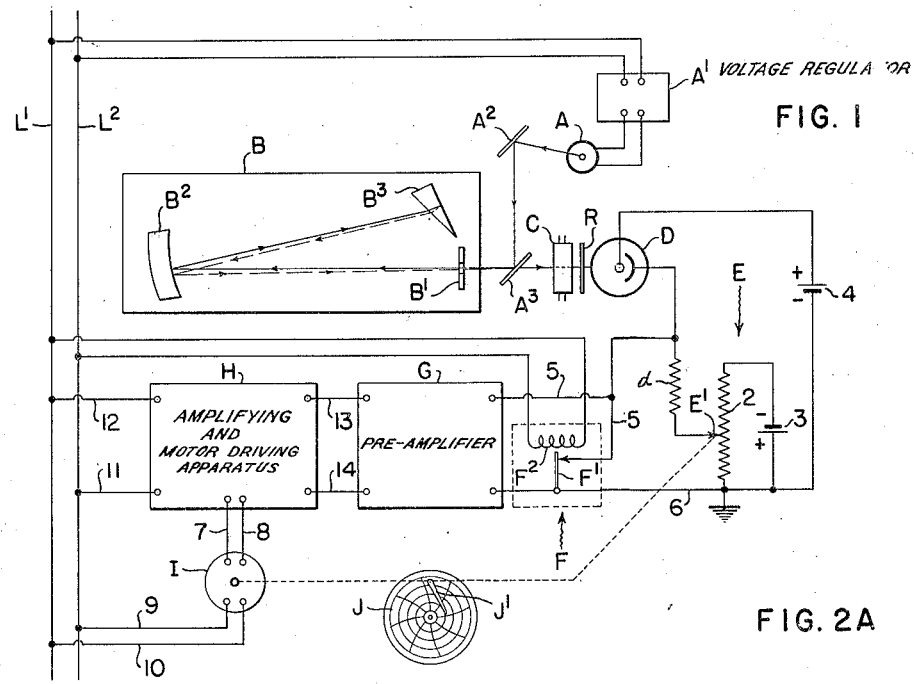
Fig. 1 is a diagrammatic representation of one form of improved ultra-violet spectrophotometer.
Figure 2A:
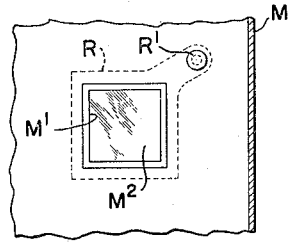
Fig. 2A is an elevation of a portion of the preamplifier box shown in Fig. 2.
Figure 2B:
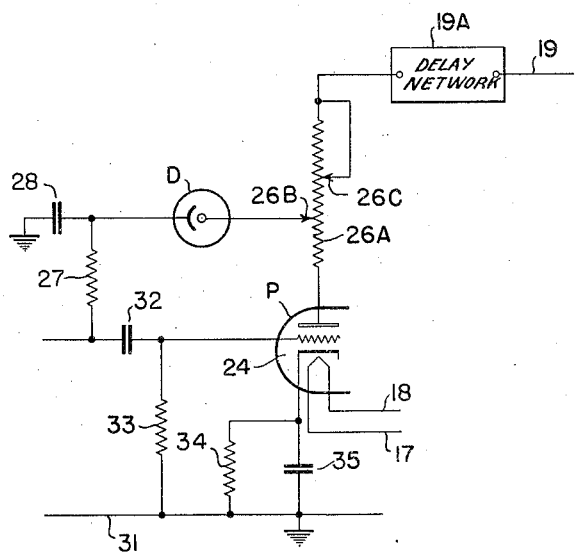
Fig. 2B is a diagram showing a modification of a portion of a circuit shown in Fig. 2.
Figure 3:
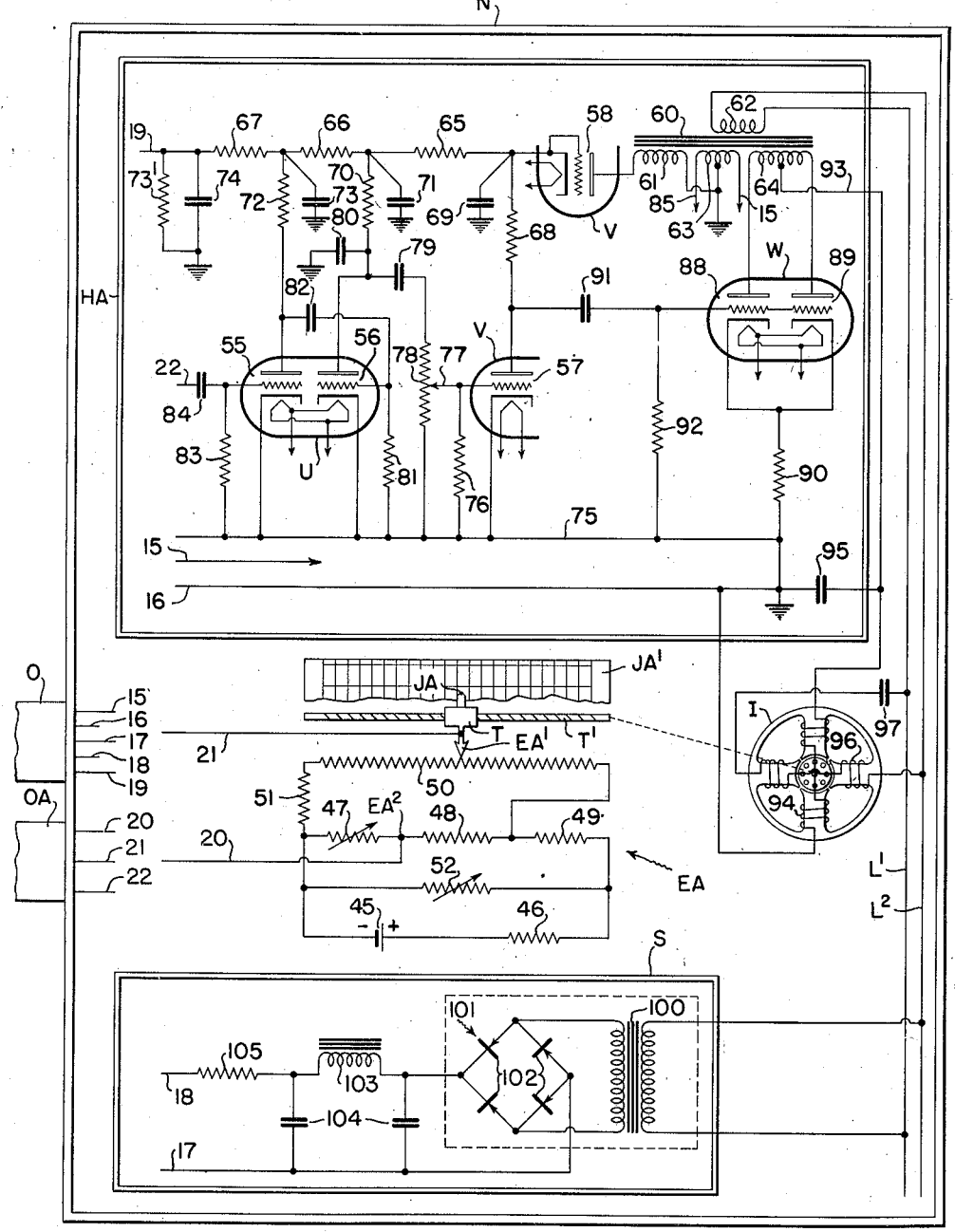
Fig. 3 is a diagram showing elements of the recording instrument section of apparatus including the features shown in Fig. 2.

In Fig. 1 I have diagrammatically illustrated one form of my improved apparatus for measuring and indicating or recording variations in the chemical composition of compounds and mixtures having characteristic spectra in the ultra-violet region, and in Figs. 2 and 3 I have diagrammatically illustrated a second form of such apparatus.

The two forms of apparatus are essentially alike in most major respects. They differ specifically, however, and the form shown in Fig. 1 lacks a desirable voltage regulation characteristic of the apparatus shown in Figs. 2 and 3, and the last mentioned figures disclose various desirable features which may or may not be included in the apparatus shown in Fig. 1, and which are not shown in that figure.

The apparatus shown diagrammatically in Fig. 1 includes a photoelectric quartz spectrophotometer, of which the essential elements are: a hydrogen lamp A or other source of light having the desired spectrum, a monochromator B to isolate radiation of the desired wave length, an absorption cell C through which a stream of liquid or gas may be continuously passed, a photoelectric cell D, a measuring circuit E in which the photoelectric cell D is connected, a converter F, a preamplifier section G, an amplifying and motor driving section H, and a reversible motor I operating to give rebalancing adjustments to the movable contact E' of the measuring circuit E and to give corresponding adjustments to an exhibiting element J'. The latter may sometimes be an indicating pointer, but is shown as a pen arm tracing a record on a chart J.

The spectrophotometer including the monochromator B may be, and as diagrammatically shown is, of the commercially available type known as the Beckman photoelectric quartz spectrophotometer, Model 9109. The optical system of the monochromator B, as schematically shown in Fig. 1, includes an opaque shield member B' formed with a lower entrance slit and an upper exit slit, a collimating mirror $B^2$ and a rotatable quartz prism $B^3$ all enclosed in a box or housing. The light source A is external to said box and is supplied with current through a voltage regulator A'. An image of the said light source is focused by a condensing mirror $A^2$ and cooperating inclined mirror $A^3$ on the entrance slit in the shield B'. Light passes from the mirror $A^3$ through the entrance slit to the collimating mirror $B^2$, and passes in the form of parallel rays from the mirror $B^2$ to the front surface of the quartz prism $B^3$. The back surface of the prism is aluminized and the light passing to and refracted at the prism front surface and then passing to the back surface of the prism is reflected back through the prism and undergoes further refraction as it emerges from the prism. The mirror $B^2$ focuses the spectrum received from the prism $B^3$ in the plane of the shield B' and a portion of the spectra so focused passes through the upper exit slit in the shield to the absorption cell C.

In the cell C, light rays are absorbed by the fluid stream flowing through the cell to an extent depending on the character of the fluid. In the above mentioned commercially available spectrophotometer, the walls of the cell C transverse to the path of light received from the monochromator are made of optically flat, fused silica plates. The light rays passing through the cell C pass to the cathode of the photoelectric cell D when not intercepted by a shutter R. The latter may be arranged as shown in Figs. 2 and 2A.

The measuring circuit E shown in Fig. 1, comprises a high resistance $d$, which may well be a 50 megohm resistance and has one terminal connected to the cathode of the photoelectric cell D and has its other terminal connected to the slider contact E'. The latter is in contact with and adjustable along the length of a slide wire resistance 2 which may be of 20 ohms. A D. C. voltage source 3, which may be a 1.5 volt battery, has its terminals connected to the terminals of the resistance 2. The positive terminal of the battery 3 and the corresponding end of the resistance 2 are shown as connected through a second D. C. voltage source 4 to the anode of the cell D.

The polarities of the batteries 3 and 4 indicated in Fig. 1, are such that the batteries act in series to pass current to the anode of the photocell D and through the latter and thence through the high resistance $d$ to the contact E', and the battery 3 passes current through the resistance 2 to the point in that resistance engaged by the contact E'. The current coming to the last mentioned point through the contact E', as well as that which comes to said point from the positive side of battery 3 through the subjacent portion of the resistance 2, passes through the upper portion of the resistance 2 to the negative side of the battery 3. Conductors 5 and 6 connect the measuring circuit to the input terminals of the converter F. The conductor 5 is connected to the measuring circuit at the positive end of the high resistance $d$ and the conductor 6 is connected to the measuring circuit at the positive end of the slide wire resistance 2.

In the balanced condition of the measuring apparatus, the potential drop in the high resistance $d$ and the potential drop in the portion of the resistance 2 between the contact E' and the positive side of the battery 3 are equal, and there is no potential difference between conductors 5 and 6. When, as a result of change in the composition of the material flowing through the absorption cell C the conductivity of the photocell D increases, there is a corresponding increase in the potential drop in the resistance $d$ and the potential of the conductor 5 becomes greater than the potential of the conductor 6. Conversely, on a change in the composition of the material flowing through the cell C which decreases the conductivity of the photocell E, the current through the resistance $d$, and the potential drop in the latter, are reduced, and the conductor 5 becomes negative relative to the conductor 6.

As diagrammatically shown in Fig. 1, the converter F includes a reed F'' continuously vibrated by alternating current flow through an associated coil $F^2$, said reed being polarized in any usual or suitable manner so that it vibrates with a frequency corresponding to the alternating current frequency which is usually 60 cycles per second. As shown in Fig. 1, the vibrating reed F' alternately establishes and breaks a low resistance connection between the conductors 5 and 6 as it moves to the right and left, respectively. In the balanced condition of the apparatus in which there is no potential difference between the conductors 5 and 6, the operation of the converter F has no significant effect, and the preamplifier G receives no signal through the conductors 5 and 6. When the measuring circuit is unbalanced, however, so that there is a potential difference between the conductors 5 and 6, the vibration of the converter reed F' causes a pulsating signal to be impressed on the preamplifier G by the conductors 5 and 6. The frequency of the pulsations is the same as the frequency of alternation of the current flowing through the coil $F^2$, there being one pulsation in one direction or the other during one half of each cycle of said alternating current depending upon which of the conductors 5 and 6 then has the higher potential.

During each period in which a difference of potential between the conductors 5 and 6 exists, the converter F, preamplifier section G and the amplifier and motor drive section H cooperate as is hereinafter explained to energize the motor I for operation in the direction and to the extent required to so adjust the slider contact E' along the slide wire 2 as to equalize the potentials of said conductors. When the motor I is thus energized, its direction of rotation is directly dependent on which of the conductors 5 and 6 has the higher potential, and the adjustment which the motor then gives the contact E' is that required to increase or decrease the portion of the resistance 2 between the contact E' and the positive side of the battery 3, until the potential drop in that resistance portion becomes equal to the potential drop in the resistance $d$.

As is shown in Fig. 3 and hereinafter described, the motor I has separate control and power windings. The terminals 7 and 8 of the motor control winding are connected to the output terminals of the section H of Fig. 1. The power winding terminals 9 and 10 are connected to alternating current supply conductors L' and $L^2$. Those conductors may be branches of any available lighting or power circuit supplying alternating current at a normal frequency and at a normal voltage. Herein the supply circuit frequency is assumed to be 60 cycles per second and its voltage is assumed to be 115 volts or so. The conductors L' and $L^2$ have branches 11 and 12 connected to the energizing terminals of the apparatus section H of Fig. 1. The apparatus sections G and H are connected by cables 13 and 14, which serve the purpose, among others, of transmitting energizing currents from the section H to the section G. The supply conductors L' and $L^2$ also supply current to the converter coil $F^2$, and to the input terminals of the voltage regulator A' which through its output terminals energizes the lamp A. The primary purpose of the voltage regulator A' is to minimize objectionable fluctuations in the light output of the lamp A as a result of such fluctuations in the voltage between supply conductors L' and $L^2$ as may normally be expected. The preamplifying, amplifying and motor drive apparatus collectively included in apparatus sections G and H of Fig. 1 need not differ from the apparatus disclosed in the embodiment of the invention illustrated in Figs. 2 and 3. In consequence of the detailed description made hereinafter of the apparatus shown in Figs. 2 and 3, it seems unnecessary to comment further herein on the apparatus sections G and H of Fig. 1.

The apparatus collectively shown in Figs. 2 and 3 comprises a preamplifier box or housing M shown in Fig. 2, a measuring and recording instrument housing N shown in Figs. 3 and cables O and OA connecting the two housings. The cable O is unshielded and includes five conductors designated 15, 16, 17, 18 and 19. The cable OA is shielded and includes three conductors designated 20, 21 and 22. To avoid unnecessary complexity in the drawings, some portions of the conductors 15-22 which are within the box M and instrument casing N, are broken away and removed. The shield of cable OA forms a potential equalizing connection between the box M and casing N and serves as a ground connection to the box M when the casing N is directly grounded and the box M is not.

The apparatus diagrammatically shown in Fig. 2 as located within the box M, includes a photocell D, which may be a counterpart of the photocell D of Fig. 1, a converter FA, which is operatively like the converter F of Fig. 1, a twin electrometer tube P, a desiccator Q and a shutter mechanism R. The apparatus diagrammatically shown in Fig. 3 as contained in the instrument casing N, includes an amplifier and motor drive section HA, a motor I like the motor I of Fig. 1, a measuring circuit EA of well known split potentiometer form which serves the general purpose of the measuring circuit E of Fig. 1, and a rectifying unit S of conventional battery charger type. The unit S is employed to supply relatively smooth rectified current to the heating filaments of the electrometer tube P. As diagrammatically shown in Fig. 3, the rebalancing motor I rotates a threaded shaft T', and thereby moves a carriage T, which is in threaded engagement with said shaft, longitudinally of the latter. The carriage T supports and adjusts a movable slide wire engaging contact EA' which corresponds to the contact E' of Fig. 1. The carriage T also carries a recording pen JA for recording the values of the measured quantity on a record chart JA'.

In a preferred practical form of the invention, the preamplifier box is sealed and contains the dessicator Q. This permits a suitably dry atmosphere to be maintained in the box M without replacing the desiccating material oftener than once every two months. The maintenance of a dry atmosphere in the box is especially advantageous because it tends to prevent photocell resistor leakage and deterioration. The desiccating material may well be magnesium perchlorate. The box M is provided with a wall opening M' and an associated window pane $M^2$ of suitable material, such as fused quartz. A shutter R is provided so that the passage of light to the photocell through the window opening M' may be readily interrupted when necessary for calibration or other purposes. In the form diagrammatically shown in Figs. 2 and 2A, the shutter R is carried by a shaft R' journalled in the wall of the box M. At its outer end the shaft R' carries a knob for manual actuation to turn the shutter R into and out of register with the window opening M'.

The apparatus collectively illustrated in Figs. 2 and 3 was designed with the expectation that its first use would be in association with spectrophotometer parts, like the parts A, B and C of Fig. 1, in the production of butadiene to be used in the manufacture of synthetic rubber. The impedance, current and voltage values and tube data hereinafter stated by way of illustration and example, are values and data which have been found appropriate in the successful practical use of the invention in the manufacture of butadiene. However, the invention may be used for other purposes, and those skilled in the art will understand that said values and data are subject to variations when conditions make this desirable.

The twin electrometer tube P shown diagrammatically in Fig. 2 is of the well known 7N7 commercial type, comprising triode valves 24 and 25. The anode of the photocell D is connected to the anode of the valve 24. Rectified current is supplied to said anodes through a 2 megohm resistor 26 by the conductor 19 connected to a rectifier tube 58 within the casing N. Current passes from the cathode of the photocell D to and through the 50 megohm resistor $d$ in Fig. 2, as in Fig. 1. In Fig. 2, however, the cell D is connected to the resistor $d$ through a filter section comprising a resistor or resistors 27 and a condenser 28, the latter having one terminal directly connected to the cathode of the photocell D and having its other terminal grounded. The capacity of the condenser 28 is 0.0005 microfarads. The single resistor 27 shown may have a resistance of 100 megohms, but in practice I prefer to employ in lieu of a single 100 megohm resistor 27, two resistor elements each of 50 megohms as they are less expensive than a 100 megohm resistor.

In the arrangement of Figs. 2 and 3, as in that of Fig. 1, the potential drop in the resistance $d$ is in bucking relation with the potential drop in a portion of a measuring circuit. In Fig. 3 the measuring circuit potential drop is between the slider contact EA' and the point EA² of the measuring circuit network. When the opposing potential drops are equal so that the measuring system is balanced, the movement of the reed FA' of converter FA into or out of engagement with the conductor 30 produces no functional effect or result. When said potential drops are unequal, however, the movement of the reed FA' into and out of contact with the conductor 30 produces a voltage fluctuation in the conductor 29. Whether the voltage of conductor 29 decreases or increases when the contact FA' separates from the conductor 30, depends upon whether the potential drop in the measuring circuit between EA' and EA² is then greater or less than the potential drop in resistor $d$. In either event, as is hereinafter explained, the voltage fluctuation in conductor 39 will cause the motor I to rotate in the proper direction to equalize the two potential drops and rebalance the measuring system.

The immediate effect of the cyclic voltage fluctuation in conductor 29, produced by the operation of the converter FA, is to impress a 60 cycle signal on the input circuit of the triode valve 24 of the electrometer tube P, through a blocking condenser 32 of 0.0025 microfarad capacity. Cathode bias for the valve 24 is provided by a 100,000 ohm resistor 34 and a parallel connected condenser 35 of 4 microfarads capacity which connect the cathode of the valve to the grounded conductor 31. A 30 megohm resistor 33 connects the control grid of the valve 24 to the grounded conductor 31.

The cathode of the valve 25 of tube P is connected to the grounded conductor 31 by a resistor 36 and a parallel connected condenser 37, of 100,000 ohms resistance and 4 microfarads capacity, respectively. The grounded conductor 31 is connected to the control grid of the valve 25 through a 2 megohm resistor 38. The control grid of the valve 25 is also connected to the anode of the triode valve 24 of the tube P through a condenser 39 of 0.05 microfarad capacity. The anode of the valve 25 is connected to the conductor 19 through a 2 megohm resistor 40. The heating filaments of the valves 24 and 25 are connected in parallel between conductors 17 and 18 of the rectifier S in the instrument casing N. The output circuit of the valve 25 includes the previously mentioned conductor 22 forming a part of the cable OA. The conductor 22 connects the anode of valve 25 to the control grid of the first stage amplifier valve 55 shown in Fig. 3.

The apparatus diagrammatically shown in Fig. 2 has novel and practically important characteristics to which references are made hereinafter, following a description of the associated apparatus enclosed in the instrument casing N.

The conventional type of split potentiometer measuring circuit EA shown in Fig. 3, comprises an energizing branch including a 1.5 volt battery 45 and a 1000 ohm resistor 46. The energizing branch has its terminals connected by two main branches in parallel with one another. One of the main branches comprises a zero adjustment resistance 47, a resistor 48 of 509.5 ohms and a resistor 49 of 30 ohms. The zero adjustment resistance 47 in circuit may be continuously varied by manual adjustment between zero and 100 ohms. The zero adjustment resistance 47 is adapted to compensate for the so-called "dark current" drift in the operation of the photocell D. The 20 ohm slide wire resistor 50 of the circuit is included in a shunt to the resistances 47 and 48. As shown, that shunt also includes a 1 ohm resistor 51 connected between one terminal of the slide wire resistance 50, and one terminal of resistance 47. The third main branch of the measuring circuit includes a span adjusting resistance 52 continuously variable by manual adjustment between zero and 100 ohms.

The amplifying and motor drive section HA of the apparatus included in the instrument casing N, comprises two twin triode 7F7 tubes U and V and a 7N7 tube W. The tube U includes two triode amplifying valves 55 and 56. The tube V includes an amplifying triode 57 and a rectifying triode 58 which is connected as a diode. For clarity of illustration, the two portions of the tube V respectively including the two valves 57 and 58, are displaced from one another. The anode of the rectifier valve 58 is connected to one terminal of the secondary winding 61 of a transformer 60. The other terminal of the secondary winding 61 is connected to ground. The transformer 60 includes two other secondary windings 63 and 64 and a primary winding 62. The latter is connected to the 60 cycle supply conductors L' and L². The cathode of the rectifier valve 58 is connected to a voltage dividing and decoupling network comprising resistance sections 65, 66, and 67 connected in series, in the order stated, between the cathode of the rectifier valve 58 and the portion of the previously mentioned conductor 19 within the casing N. The resistances of the resistors 65, 66 and 67 are 50,000, 150,000, and 500,000 ohms, respectively.

The cathode of the rectifier valve 58 is connected through a 1 megohm resistor 68 to the anode of the amplifier valve 57, and is also connected to ground through a condenser 69 of 10 microfarads capacity. The junction of the resistors 65 and 66 is connected to the anode of the valve 56 through a 1 megohm resistor 70 and is connected to ground through a condenser 71 of 10 microfarads capacity. The junction of the resistors 66 and 67 is connected to the anode of the valve 55 through a 1 megohm resistor 72, and is connected to ground through a condenser 73 of 10 microfarads capacity. The terminal of the resistance 67 connected to the conductor 19 is connected to ground through a 180,000 ohm resistor 73' and a condenser 74 of 4 microfarads capacity, connected in parallel. The condensers 69, 71 and 73 and associated resistances and ground connections provide an effective filter action to smooth out ripple in the output current of the rectifier valve 58, and also provide decoupling between the various stages of the amplifier.

The cathodes of the triode valves 55, 56 and 57 are directly connected to a grounded conductor 75. The control grid of the valve 57 is connected to the conductor 19 by a 0.25 megohm resistor 76. The control grid of the valve 57 is also directly connected through a slider contact 77 to a 1 megohm potentiometer resistor 78 having one terminal connected to the grounded conductor 75 and having its second terminal connected through a condenser 79 of 0.05 microfarad capacity, to the anode of the valve 56. That anode is also connected to ground through a condenser 80 of 0.01 microfarad capacity.

The control grid of the valve 56 is connected to the ground conductor 75 through a 1 megohm resistor 81. The control grid of the valve 56 is also connected to the anode of the valve 55 through a condenser 82 of 0.05 microfarad capacity. The control grid of the valve 55 is connected to the grounded conductor 75 through a 2 megohm resistor 83. The control grid of the valve 55 is also connected to one end of the conductor 22 through a condenser 84 of 0.05 microfarad capacity. The other end of conductor 22 is directly connected to the anode of the valve 25 in the electrometer tube P of Fig. 2. As will be apparent, the resistors 83, 81 and 76 serve as grid leak resistances for the triode valves 55, 56 and 57, respectively.

The previously mentioned secondary winding 63 of transformer 60 supplies current through its terminals 15 and 65 to the heater filaments of the valves 55, 56 and 57 and to the heater filaments of the two motor drive valves 88 and 89 in the 7N7 tube W of Fig. 3. For drawing simplification, in Fig. 3 portions of the conductors connecting the heater filaments last mentioned to the terminals 15 and 65 of winding 63 are broken away and removed. The transformer secondary winding 63 has a center tap connection to ground, and only one-half of the voltage induced in the winding 63 is impressed on the winding FA² of the converter FA of Fig. 2. As will be observed, one terminal of said winding FA² is directly connected to one terminal of the transformer winding 63 by the conductor 15. The second terminal of the winding FA² is connected to the midpoint of the transformer winding 63 by the conductor 16 and the ground connection, shown in Fig. 3, between the conductor 16 and the center tap of the transformer winding 63.

The end terminals of the secondary winding 64 of the transformer 60 are connected to the anodes of the two triode valves 88 and 89 of the 7N7 tube W of Fig. 3. The cathodes of the valves 88 and 89 are each connected through the same 150 ohm resistor 90 to ground. The two control grids of the valves 88 and 89 are connected to the anode of the valve 57 through a condenser 91 of 0.05 microfarad capacity. Both of said control grids are also connected through the same 150,000 ohm resistor 92 to ground. The tube W directly controls the energization of the control winding 94 of the rebalancing motor I. The winding 94 is connected in parallel with a condenser 95 of 1 microfarad capacity, and has one terminal connected to ground and has its second terminal connected to a center tap from the transformer secondary winding 64. The motor I includes a power winding 96 connected between the alternating supply conductors L' and L² in series with a condenser 97 of 1 microfarad capacity.

The 60 cycle alternating current supplied to the control winding 94 through the apparatus hereinbefore described, is approximately 90° out of phase with the current flowing in the motor power winding 96. The motor windings 94 and 96 cooperate to produce a rotating magnetic field which revolves in one direction or in the opposite direction, accordingly as the alternating current flowing through the control winding 94 leads or lags behind the current flowing through the power winding 96. Whether the current flowing through the control winding 94 leads or lags, the current flowing through the winding 96 depends on which of the potentials of the conductors 20 and 21 of the measuring circuit is the higher. That potential relation determines whether the output current of the valve 24 is substantially in phase or 180° out of phase with the voltage between the supply conductors L' and L².

As those skilled in the art will recognize, the amplifying and motor drive apparatus HA shown in Fig. 3 is of a general type which may be referred to as standard, because of its employment in a conversion type, continuously operating, self-balancing measuring instrument which has been in extensive use in this country for several years. Moreover, said standard amplifying and motor drive system is fully disclosed in the patent of Walter P. Wills, 2,423,540 granted July 8, 1947, on an application filed December 1, 1941. It seems quite unnecessary, therefore, to further describe herein those structural and operating characteristics of the apparatus HA of Fig. 3 which do not differ from those of said standard type and are fully disclosed in said Wills patent. There are, however, certain specific differences between the apparatus shown in Fig. 3 and the prior standard amplifying and motor drive apparatus.

Thus, in the standard apparatus, the potential relation of the cathode and control grid of the valve corresponding to the valve 55 of Fig. 3, is dependent upon cathode bias, whereas in Fig. 3, it depends upon grid leak bias. The substitution of grid leak bias for cathode bias simplifies the cathode and ground wiring and has no significant effect upon the amplification.

The valve 55 has a high impedance input circuit, whereas the corresponding valve of the standard apparatus does not, and the standard apparatus includes nothing corresponding to the by-pass condenser 80 which in Fig. 3, connects the anode of the valve 56 to ground. The condenser 80 prevents high frequency oscillations in the amplifier, which the unavoidable stray coupling between the output stage of the amplifier system and an input stage thereof tends to cause. Thus, the 0.01 microfarad condenser presents high impedance to 60 cycle signals, but low impedance to higher frequency signals. For example, at 60 cycles the condenser 80 has an impedance of 265,000 ohms, while its impedance is only 2,650 ohms at 6,000 cycles. Any oscillation which tends to develop in the main amplifier, is of such high frequency, and is by-passed to ground, and thus attenuated by the action of the condenser 80. Such a high frequency signal by-pass condenser is made necessary in the amplifier system shown in Fig. 3 because of the high impedance of the input circuit of the valve 55.

In the standard apparatus, the control grid of the valve corresponding to the valve 57 of Fig. 3, is connected to a potentiometer or slide wire resistance which is like the resistor 78, and which is connected between ground and the anode of the valve corresponding to the valve 56 of Fig. 3. The standard arrangement, however, includes nothing like the 0.25 megohm resistor 76 through which the control grid of the valve 57 is connected to ground in Fig. 3. The use of the resistor 76 decreases the maximum D. C. resistance between the control grid of the valve 57 and ground from 1 megohm to about .2 of a megohm at maximum gain setting. The voltage gain is thereby reduced from 30% to 50%.

This reduction in grid-to-ground D. C. resistance eliminates the tendency otherwise existing to the establishment of an excessive self bias potential on the input circuit of the valve 57. With the resistor 76 omitted from the apparatus shown in Fig. 3, signal currents of a magnitude as small as 5 micromicroamperes block the valve 57 to such a degree that the motor drive speed is made as low as 15% of the maximum up scale speed, and 25% of the maximum down scale speed. The use of the resistor 76, as shown in Fig. 3, increases the motor speed to over 90% of maximum for all signals from 2 to 1500 micromicroamperes, both up scale and down scale.

The effect on the motor speed of the resistor 76 apparently results from sharp reductions in D. C. resistance and in the time constant of the grid circuit of valve 57, which permits the current wave reaching the grids of the valves 88 and 89 to be more nearly square, so that the last mentioned valves are cut off for a greater fraction of a half-cycle than they would be if the current wave were less square. The effect of the last mentioned difference between the standard apparatus and that shown in Fig. 3, is relatively unimportant in the normal use of the standard apparatus, because with it the amplifier input signal wave is nearly square and blocking is not a serious problem. In the high impedance work contemplated herein, however, the A. C. signal impressed on the control grid of valve 55 has a pronounced sawtooth shape during one half-cycle. With an odd number of voltage amplifier stages as shown in Fig. 3, the sawtooth portion, when amplified, represents the signal which must cut off the power tube valves 88 and 89 to produce a motor drive effect. The combination of blocking and a sawtooth input A. C. signal wave form results in very poor motor drive effect for large signals, and only by reducing the blocking can a satisfactory motor response be obtained.

It is also to be noted that the condenser 74 not only forms a part of the voltage divider and filter circuit for supplying 30 volts D. C. through the conductor 19 to the electrometer tube P and photocell D, but also provides a decoupling action which prevents fluctuations in the current flow in the voltage divider comprising resistors 65, 66 and 67, produced by changes in the plate currents of the valves 55, 56 and 57, from being fed into the preamplifier.

The rectifying unit S shown in Fig. 3, is of a known 6 volt battery charger type. It comprises a transformer 100 having its primary winding connected to the alternating current supply conductors L' and L², and having its secondary winding connected to diagonally opposed corners of a conventional bridge type, copper oxide film, rectifier 101 including a contact rectifying element 102 in each of the four arms of the bridge. One of the two bridge junctions not connected to the secondary of transformer 100 is connected to the conductor 17, and the other is connected to the conductor 18. As has been explained, those conductors are included in the cable O. Within the box M, the heater filaments of the electrometer valves 24 and 25 are connected in parallel between the conductors 17 and 18. A filter comprising an inductor 103 inserted in the conductor 18, and two condensers 104 connected between the conductors 17 and 18, minimizes ripple in the current supplied to the heater filaments of the tube P. The inductor 103 has an inductance of 0.3 henry, and the capacity of each of the condensers 104 is 500 microfarads. As shown, an 8 ohm resistor 105 is inserted in the conductor 18. The connection of the resistors 41 and 42 in series between the heater filament supply conductors 17 and 18 of the tube P and the grounded connection to the connected ends of said resistors, contribute to a reduction in noise effects by balancing out ripple in the heater circuit.

The general operation of the apparatus shown in Figs. 2 and 3 will be apparent to those skilled in the art from the drawings and the foregoing description and explanations. The apparatus tends to maintain the measuring system in its balanced condition in which the potential drop due to the flow of photoelectric current through the 50 megohm resistor $d$ is equal in magnitude to the opposing or bucking potential difference between the point $EA^2$ and slider contact $EA'$ of the measuring circuit EA. The photocell current is very small. The light flux corresponding to a 1% transmission interval is of the order of 3 times $10^{-6}$ lumens. This small amount of light produces a photocell current of about 3 times $10^{-13}$ amperes.

In the balanced condition of the measuring apparatus, movement of the vibrating reed $FA'$ of the converter FA into and out of engagement with the conductor 30 is functionless, since there is no difference in potential between the conductors 30 and 31. On a change in the magnitude of the photocell current, the potential drop in the resistance $d$ increases or decreases, and correspondingly increases or decreases the potential of the conductor 29 relative to the potential of the conductor 21 and measuring system contact $EA'$. The operation of the converter then impresses a 60 cycle pulsating signal on the input circuit of the electrometer valve 24. The output of the valve 24 is amplified in successive stages by the valve 25 of Fig. 2, and the valves 55, 56 and 57 of Fig. 3. The output circuit of the last stage amplifier valve 57 impresses a control signal on the control grids of the motor driving valves 88 and 89 of the power tube W.

The 60 cycle signal impressed on the control grids of the valves 88 and 89 can make one only of the two valves conductive at a time. Which one of the two valves 88 and 89 is thus made conductive at any instant depends on whether the voltage drop in resistor $d$ then exceeds or is less than the voltage drop in the measuring circuit between the points $EA'$ and $EA^2$. The motor I operates in one direction or in the opposite direction, accordingly as one or the other of the valves 88 and 89 is made operatively conductive. In the balanced condition of the apparatus in which no signal is impressed on the input circuit of the valve 24, there is no significant 60 cycle current flow in the output circuit of either of the valves 88 and 89, and the motor I is then stationary.

The general type of apparatus for energizing and controlling a rebalancing motor, which we have referred to as standard apparatus and which is disclosed herein and in the above mentioned Wills patent, has practically important advantages, particularly in respect to the manner in which the motor speed varies with the extent of measuring circuit unbalance, and in respect to the manner in which the operation of the motor is interrupted so as to avoid overtravel and hunting. Further comment on those advantages is unnecessary herein, however, inasmuch as they are well known and did not originate with me. It is an advantageous characteristic of the present invention, however, that it permits of a desirably simple and effective utilization of general features of the standard type of motor energizing and control mechanism, in measuring minute currents in high resistance circuits. In the previous description herein of the apparatus HA of Fig. 3, reference has been to specific differences between that apparatus and the above mentioned standard apparatus.

The apparatus shown herein possesses advantageous characteristics which are novel and practically important. It is, so far as I am aware, the first apparatus for measuring minute D. C. current flow in a high resistance circuit to be provided with means for converting the current measured into alternating current prior to its amplification. Prior to my invention, it was believed necessary to amplify such minute currents in D. C. amplifiers. For such use, however, D. C. amplifiers are objectionably unstable because of changes in the vacuum tubes, characteristic changes in tube filament emissions, change in contact potentials, mechanical vibrations, in adequate shielding, drifts in supply voltages, changes in value of resistances and their components, and temperature and humidity effects. The variable and unpredictable factors just referred to cause troublesome and erratic operation of D. C. amplifiers used in amplifying minute electric currents.

The objections mentioned in the preceding paragraph to the amplification of very small D. C. currents in direct current amplifying tubes, are well known. All of those objections are set forth, for example, in application Serial No. 532,738, filed May 9, 1944, by the above mentioned Walter P. Wills and myself as joint inventors. That application discloses apparatus including an ultraviolet ray spectrophotometer intended for the same service as the spectrophotometer shown in Fig. 1, and the present invention comprises improvements in the apparatus disclosed in said prior application, which were conceived and developed for the express purpose of avoiding objections developed in the operation of the apparatus disclosed in application Serial No. 532,738.

In said application Serial No. 532,738, the minute direct current to be measured is subjected to two stages of amplification in direct current amplifying tubes, and is then converted into alternating current. That alternating current is amplified and utilized generally as alternating current is amplified and utilized in the apparatus HA hereof. In said prior application, the first stage direct current amplification is effected in a relatively expensive tetrode tube, specially designed for electrometer tube service. Instead of measuring the potential drop created by passing the photoelectric tube current through a 50 megohm resistor like the resistor $d$ in the prior application, that current is passed through a 2,000 megohm resistor. Notwithstanding the use of the tetrode electrometer tube and the 2,000 megohm resistor, it has been found necessary to recalibrate the apparatus of the prior application every 15 minutes, or so, in regular operation and frequently to charge and replace the batteries used with the apparatus to avoid objectionable instability of operation and drift. The apparatus disclosed in the prior application has been found open to the practical objections that it is unduly complicated and expensive, and unduly difficult to maintain in operative condition. For one thing, a 2,000 megohm resistor is much more apt to deteriorate as a result of excessive humidity or contact with ammoniacal vapors and other gases to which it may be exposed in oil refineries and other industrial plants, than is a 50 megohm resistor or a 100 megohm resistor.

While the standard twin triode 7N7 tube P of Fig. 2 is used as an electrometer tube, it is so used primarily to avoid noise effects, and to insure stability of operation, and not to avoid the tube drift tendency which is the primary purpose for which an electrometer tube is used in the amplification of small direct currents. When used for A. C. amplification with relatively low grid currents and plate and heater filament voltages, no significant calibration drift tendency is experienced in the operation of the tube P, and the production of objectionable noise effects is greatly reduced. The reduction of noise effects in the apparatus disclosed is practically important, because those effects tend to overload and swamp out the amplifier and thus deprive it of control of the rebalancing motor. Moreover, some noise effects have frequency components sufficiently close to 60 cycles to cause motor chatter and the production of a wavering record line.

With the electrometer and preamplifier circuit arrangement shown in Fig. 2, the grid currents are kept desirably small with a resultant reduction in each of three factors tending to materially interfere with the proper operation of the system, those factors being D. C. permanent strays, D. C. transient strays, and statistical noise effects which cause motor chattering and amplifier blocking. Low grid currents are obtained with the apparatus shown in Fig. 2, primarily as a result of the relatively small plate and heater filament operating voltages of the electrometer tube P valves, and particularly of the valve 24. While the normal heater filament voltage of a 7N7 tube is 6.3 volts, in regular operation of the apparatus shown in Fig. 2, the voltage impressed on each heater filament of the tube P is 3 volts. Each anode of the tube P is regularly operated with a plate voltage of about 20 volts, although the normal plate voltage rating for a 7N7 tube is more than 90 volts and such tubes are operative with peak voltages of 250 volts. In the regular operation of the apparatus shown in Fig. 2, the grid bias obtained by the cathode bias resistor of the tube P is about 0.8 of a volt. The use of cathode bias is important because it provides an action which is degenerative in character and tends to maintain constant plate current flow notwithstanding changes in line voltage which greatly effect cathode emission in the operating range. With the described operating voltages, the grid currents in the tube P are made low initially and their maximum values are less than 2 micromicroamperes.

Fluctuations in line voltage tend to cause objectionable transient D. C. changes in the current flowing through the photoelectric cell D which are minimized by the voltage regulating characteristics of the tube P, and particularly of its first stage amplifying valve 24. Leakage of the blocking condenser 32 has a tendency to produce permanent strays which are minimized by the fact that the grid current is initially kept at a relatively low level. Leakage of the blocking condenser 32 causes some of the grid current flowing through the 30 megohm resistor 33 to flow through the 50 megohm measuring resistor $d$, with the result that a spurious 60 cycle driving signal is produced, which varies with line voltage changes since the grid current varies with line voltage changes. Condenser 32 serves as an isolation device between valve 24 and resistor $d$ in respect to the steady component of current flow through said resistor. Operation of the valves of tube P with low cathode temperature and low plate voltage restricts accumulation on the control grid of electrons emitted by the respective cathodes, and, more importantly, restricts the grid-cathode currents. Restricting those currents reduces the leakage currents of condenser 32.

Sudden line voltage changes produces sudden changes in grid current flow through the resistor 33 and are passed by the condenser 32 and cause a D. C. current flow through the measuring resistor $d$ during the period required to charge and discharge the condenser 32 to a new equilibrium condition. This current flow through the resistor $d$ produces across the latter a voltage which causes a transient shift in the balance position of the recorder. This undesirable shift is made negligible by initially maintaining the grid current at a low value.

The statistical noise currents in the resistor 33 are produced by fluctuations in ion current flow to the grid of the valve 24, which flow is of a very erratic nature. These currents produce signals on the grid of the valve 24 which not only tend to overload and swamp out the amplifier, but also include components of frequencies of about 60 cycles which would cause motor chatter, were they not maintained at a low initial value.

The resistor 27 and condenser 28 in the photocell circuit, form a filter which is provided to eliminate ripple in the photocell current due to the fact that the hydrogen lamp A which illuminates the photocell may be A. C. operated. The filter reduces pick-up of A. C. strays, and also minimizes the photocell statistical noise tendency caused by the random nature of the photocell emission. The resistor 27 also serves to isolate the control grid of valve 24 from the filter by-pass condenser 28.

In Fig. 2, the D. C. operating voltage for the photocell circuit is furnished by the plate circuit of the first stage electrometer valve 24. The first stage valve instead of the second stage valve is used as the source of photocell current to eliminate feedback effects. With the electrometer tube arranged and operated as described, the effects of fluctuations in the supply voltage on the anode voltages of the photocell and valve 24 may be relatively quite small. With the arrangement shown in Fig. 2, the fluctuations in the voltage between supply conductors L' and L² produce fluctuations in the electrometer tube and photocell anode voltages which are only about a third as great as the first mentioned fluctuations. Indeed, it is possible to connect the photocell anode to a tap on the resistor 26 with the result that fluctuations in the voltage of the supply conductors L' and L² through a normal range will have no significant effect on the voltage of the photocell anode, as will be described hereinafter.

Such differences between the anode voltage and supply voltage fluctuations find their explanation in a compensating action of the electrometer tube valves, when the latter are operated as described above with relatively low plate circuit and heater filament voltages. With such operation, an increase in the supply voltage increases the current flowing in the heater filaments, as well as the current flow in the plate circuits of the tube P. The increase in heater filament current so greatly increases the emission of electrons and thereby causes such plate current increases, that the voltage drop in the resistor 26 may greatly reduce the ratio of the changes in the voltage of the conductor 19 to the changes in the voltage of the anode of valve 24. Indeed it is possible to proportion the circuits so that throughout a substantial range of variation of the voltage of the conductor 19, the voltage of the anode of the valve 24 will remain approximately constant, or so that the voltage of said anode will actually decrease and increase, respectively, as the voltage of the conductor 19 increases and decreases.

For example, with the resistance 26 of Fig. 2 replaced as shown in Fig. 2B, by a potentiometer resistance 26A engaged by a slider contact 26B through which the anode of the photocell D is connected to the anode of the valve 24, the contact 26B may be adjusted along the resistance 26A into such position that the potential of the anode of the photocell D will be substantially independent of fluctuations in the voltage of the supply conductor 19, while at the same time the value of the resistance 26A is such that the potential of the anode of the valve 24 will go down or up on an increase or decrease in the voltage of the conductor 19. By varying the amount of resistance 26A in circuit, as by means of the adjustable resistance shunt 26C, the potential of the anode of the valve 24 may be kept substantially constant notwithstanding a wide variation in the voltage of the conductor 19. In such case the slider contact 26B should be at the extreme lower end of the resistance 25A if it is desired to keep the potential of the anode of the photoelectric cell D constant, as is usually the case.

With the cathode heating filament energized from a supply source fluctuating in voltage as does the source of current supplied to the conductor 19, a time delay network 19A may be employed to compensate for the lag of the cathode temperature change behind the change in the supply voltage, but no such time delay network is needed when the cathode of the valve 24 is a filament the temperature of which changes almost instantly when the filament current changes.

Statistical noises due to random electron movements in the high resistance resistors in the photocell circuit and input circuit of the tube P, are a function of temperature and of the resistance value of the resistors, and are independent of the material from which the resistors are made. It is desirable in this preamplifier to use carbon resistors because high value carbon resistors are not susceptible to magnetic pick-up and are much cheaper than other types which may be obtained. Carbon resistors introduce what is known as carbon granular noise. All of the noise effects just mentioned, are kept relatively small by the described operation of the electrometer tube valves 24 and 25 with relatively low plate, control grid, and heater voltages. The noise effects are also relatively small because of the relatively low mu of the 7N7 electrometer tube P. In regular operation, the total gain collectively obtained in the valves 24 and 25 is only about 25. The 7N7 tube P has the advantage for its described use as an electrometer tube, of low microphonics, as well as of low leakage due to locktal construction, the pins being mounted in glass and a guard ring being provided which tends to by-pass leakage to ground.

It is also noted that the zero or suppression adjustment of the resistance 47 is practically important in the continuous production of butadiene, wherein the apparatus shown in Figs. 2 and 3 is given a zero calibration adjustment once during each eight hour shift. The zero adjustment calibration then made, consists in flushing out the absorption cell with nitrogen and then adjusting the resistance 47 as required to bring the pen JA to its zero position.

The converter FA is generally like the converter employed in the previously mentioned conversion type potentiometer in commercial use, but differs from the latter in that the coil FA² is energized with three volts and the vibrating reed FA' has a natural vibration period of 73 cycles per second whereas the coil of the prior converter was energized with six volts and the reed of this converter had a natural vibration period of 88 cycles per second. The use of the lower coil energizing voltage of three volts in the converter of the present invention substantially eliminates the undesirable input signal produced in the input circuit when the coil of the converter is energized with six volts. This undesirable input signal, when present, tends to lower motor torque and produce unstable operation, but the reasons for its production when the converter coil is energized with six volts and its substantial disappearance when the coil is energized with only three volts are not now known to me. Increasing or decreasing the converter coil energizing voltage above or below three volts causes this undesirable signal to appear in the amplifier input.

When three volts instead of six volts is used to energize the converter coil, the natural vibration period of the vibrating reed must be reduced from 88 cycles per second to 73 cycles per second in order that the duration of contact, amplitude of vibration, voltage wave shape, and general desirable operating characteristics obtained with a coil energizing voltage of six volts and a natural reed vibration period of 88 cycles per second will be had when the coil energizing voltage is three volts.

The converter reed as shown in Figs. 1 and 2 is, in effect, a single pole-single throw switch and is connected to ground. This arrangement has been found very efficient for high impedance conversion. The ground connection to the reed is practically important because it eliminates all need to insulate the reed and makes it unnecessary to shield the reed so as to avoid pickup of alternating current strays therein.

Figure 9:
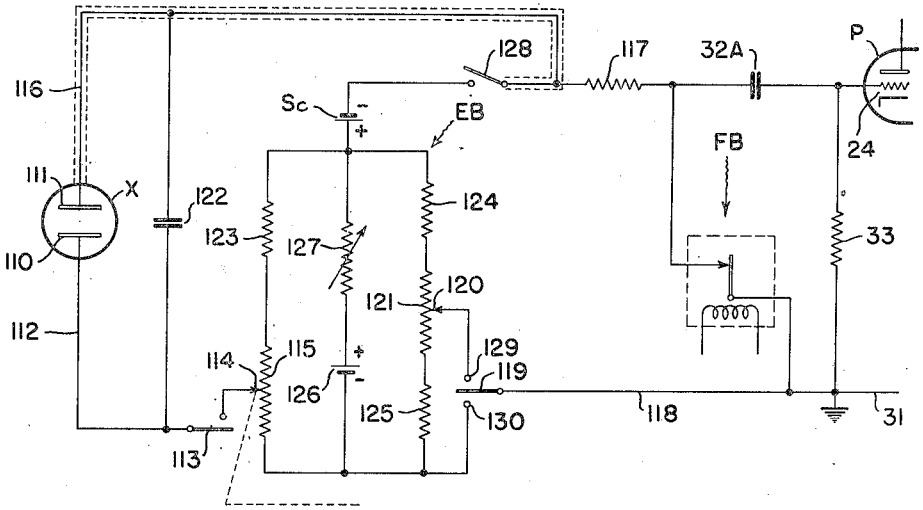
Fig. 9 is a diagram illustrating a modification of the apparatus shown in Fig. 2 for use in measuring pH.

As has been hereinbefore stated, the present invention is well adapted for uses other than spectroanalysis, one such other use being the measurement of the pH or hydrogen ion concentration in solutions. Fig. 9 illustrates diagrammatically apparatus for measuring pH in accordance with the present invention. That apparatus may be exactly like the apparatus shown in Figs. 2 and 3, except in respect to the means for impressing an alternating current signal on the input circuit of the valve 24 in the electrometer tube P.

The apparatus shown in Fig. 9 includes a high resistance glass electrode type cell X, with a calomel electrode 110, and a glass electrode 111, and may be of the type and form disclosed in the Cary Patent 2,232,211 of February 18, 1941. The resistance of the glass electrode of such a cell may be as high as 500 megohms. As shown in Fig. 9, the electrode 110 is connected by a conductor 112, switch 113, and slider contact 114 to a slide wire resistor 115 included in a measuring circuit EB. The electrode 111 is connected by a shielded conductor 116 to one terminal of a 50 megohm resistor 117. The other terminal of that resistor is connected to the measuring circuit EB through a converter or circuit interrupter FB, conductor 118, switch 119, and adjustable contact 120 engaging a resistor 121 included in the measuring circuit EB. The terminal of the resistor 117 connected to the converter FB, is also connected through a blocking condenser 32A to the control grid of the valve 24 in a tube P. The latter may be exactly like the tube P of Fig. 2, and may form a part of a preamplifier associated with an amplifier and motor drive section as in Figs. 2 and 3. The conductor 118 and second terminal of the converter FB are connected to the grounded conductor 31 and thereby to the cathode (not shown in Fig. 9) of the valve 24, as in Fig. 2. The control grid of valve 24 and grounded conductor 31 are connected by a 30 megohm resistor 33, in Fig. 9 as in Fig. 2. The conductors 112 and 116 are connected by a condenser 122 of 0.001 microfarad capacity.

The measuring circuit EB is a split potentiometer circuit slightly different in form from the circuit EA of Fig. 3. The slide wire resistor 115 is included in series with a resistor 123 in a branch of the measuring circuit which is in parallel with a branch including the resistance 121, and each of said branches is in series with the energizing branch of the measuring circuit. The branch including the resistance 121 also includes resistances 124 and 125 at opposite sides of the resistance 121, which are respectively connected to the previously mentioned resistances 123 and 115. The energizing branch of the measuring circuit includes a 1.5 volt battery cell 126 and a variable resistance 127. The ohmic values of the resistors 115, 121, 123, 124 and 125 are 40, 100, 55, 750 and 150 ohms, respectively. The resistance 127 may be varied by adjustment between values of 0 and 100 ohms. Some, at least, of the above stated resistance values of Fig. 9 may be varied without significantly affecting the operation of the apparatus. However, the values stated have been found suitable and suitably related in the operation of the apparatus shown in Fig. 9 for a commonly used range of pH measurement.

The normal operation of the apparatus shown in Fig. 9 is essentially like that of the apparatus shown in Figs. 2 and 3, in that the slider contact 114 is adjusted as is the contact EA' of Fig. 3 for the purpose of keeping the potential drop in the measuring circuit between the contacts 114 and 120 equal in magnitude to be potential difference between the terminals of the circuit including the cell X. When said potential drop and potential difference do not balance one another, the 60 cycle alternating signal impressed on the input circuit of the valve 24, after amplification effects the proper corrective adjustment of the contact 114 along the slide wire 115. That adjustment may be effected through a motor I, as the contact EA' is adjusted in Fig. 3. The condenser 122 connected across the terminals of the cell X, delays the appearance of the pH electrode voltage change across the conversion system and thus subjects the measuring circuit rebalancing system to a desirable damping action which reduces the risk of overtravel of the balancing motor and hunting.

Standardization of the current in the energizing branch of the measuring circuit of Fig. 9, is effected by connecting a standard cell Sc to the energizing branch of the measuring circuit EB, the battery 126 and cell Sc being in bucking relation. This is accomplished by closing a normally open switch 128, opening the normally closed switch 113, and adjusting the switch 119 from its normal or running position into a standardizing position. For such adjustment, the switch 119 is moved out of engagement with a contact 129 connected to the contact 120, and into engagement with a contact 130 connected to the connected terminals of battery 126 and resistors 115 and 125. With the switches in their standardizing positions, standardizing is effected by adjusting the resistance 127 into the condition in which no signal is impressed on the control grid of the valve 24.

The general principles of the present invention may be utilized with circuit arrangements of many forms, some of which are illustrated, by way of example, in Figs. 4, 5, 6, 7 and 8. The different circuit arrangements shown in those figures are adapted for use in apparatus of the general character, and serving the general purposes, of the apparatus shown in Fig. 1, and in Figs. 2 and 3. In the arrangement shown in Fig .4, the photocell D has its cathode connected to a grounded conductor 201 through the resistor $d$ of high resistance, and has its anode connected by conductor 202 to a source of positive potential. As shown, the junction point 203 of the connected terminals of the photocell cathode and resistor $d$ is directly connected to one terminal of a converter F, and to the control grid of a tube PA including a triode valve. The latter may have the operating characteristic of the valve 24 of Fig. 2. The cathode of the tube PA is connected to the grounded conductor 201, and the output circuit of the tube PA is connected to an amplifier and motor drive apparatus HB through which the tube PA controls the operation of the motor I. The apparatus HB is intended to serve the purposes collectively served by, and may comprise parts like those of, the apparatus HA of Fig. 3 and the electrometer tube 25 of Fig. 2.

The motor I of Fig. 4 adjusts the slider contact E' along the slide wire resistance 200 of a simple potentiometer measuring circuit EB including an energizing battery 200', in the direction and to the extent required to normally maintain the contact E' and the control grid of the valve PA at the same potential. The contact E' is connected to the second terminal of the converter F. When the apparatus shown in Fig. 4 is unbalanced, so that the contact E' and control grid of the valve PA differ in potential when disconnected by the converter F, the operation of the latter will impress a pulsating signal on the tube PA. This signal acts on the tube PA like an alternating current signal, and is in a phased relation to the alternating current flow through the converter winding $F^2$ which is dependent on whether the contact E' is positive or negative relative to the circuit point 203.

The arrangement shown in Fig. 5 includes a tube PA. The latter is energized as is the tube PA of Fig. 4, but has its control grid permanently connected to the junction point 203 of the terminal of the cathode of the photocell D, and the adjacent end of the resistor $d$. In Fig. 5, the energizing circuit of the cell D comprises a battery 204 connected in series with the photocell D and resistance $d$. The terminal of the resistance $d$ remote from the cathode of the photocell D, is connected to a contact $EA^3$ engaging a slide wire resistance included in a branch of a split potentiometer circuit EC. The main slide wire 200 of the circuit EC is engaged by a slider contact EA' and is included in a branch of the circuit in parallel with the branch including the slide wire engaged by the contact $EA^3$. One terminal of the converter F of Fig. 5 is connected to the contact EA', and the other terminal of the converter is connected to the cathode of the photoelectric cell D and to the control grid of the valve PA. The grounded conductor 201 is connected to the measuring circuit at the positive side of the circuit energizing battery 200'.

In the balanced condition of the apparatus shown in Fig. 5, the potential drop in the resistance $d$ is in bucking relation to the potential drop between the slider contacts EA' and $EA^3$. When the two potential drops are equal in magnitude, the operation of the converter F has no effect on the operation of the tube PA. When the two potential drops are unequal, the operation of the converter impresses a phased pulsating signal on the control grid of the tube PA to thereby actuate the associated motor I, (not shown in Fig. 5) to adjust the contact EA' as required to make the potential drop between the contacts EA' and $EA^3$ equal to the potential drop through the resistance $d$.

Figure 6:
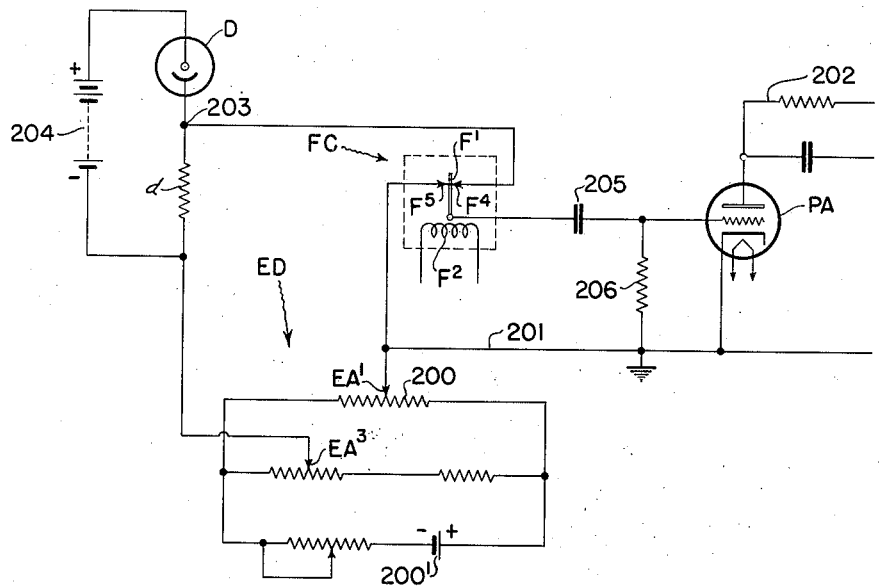

The arrangement shown in Fig. 6 is essentially like the arrangement shown in Fig. 5, except in respect to the converter FC and its connections, and in that in Fig. 6, the grounded conductor 201 is connected to the measuring circuit ED through the slider contact EA'. The converter FC has its vibrating reed F' alternately engaging a contact $F^4$ connected to the cathode of the cell D, and a contact $F^5$ connected directly to the potentiometer contact EA' and to the grounded conductor 201. The converter reed F' is connected to the control grid of the tube PA through a coupling condenser 205, and a grid leak resistor 206 connects this control grid to ground.

When the system shown in Fig. 6 is unbalanced so that the cathode of the photocell D and slider contact EA' are at different potentials, the converter will impress one signal potential on the control grid of the tube PA when the converter reed F' engages the contact $F^4$, and will impress a different signal potential on said control grid when the reed engages the contact $F^5$. The unequal signals collectively form a composite alternating current signal. The phase relation of the composite signal to the alternating current in the converter winding F² depends on which of the converter contacts F⁴ or F⁵ has the higher potential.

Figure 7:
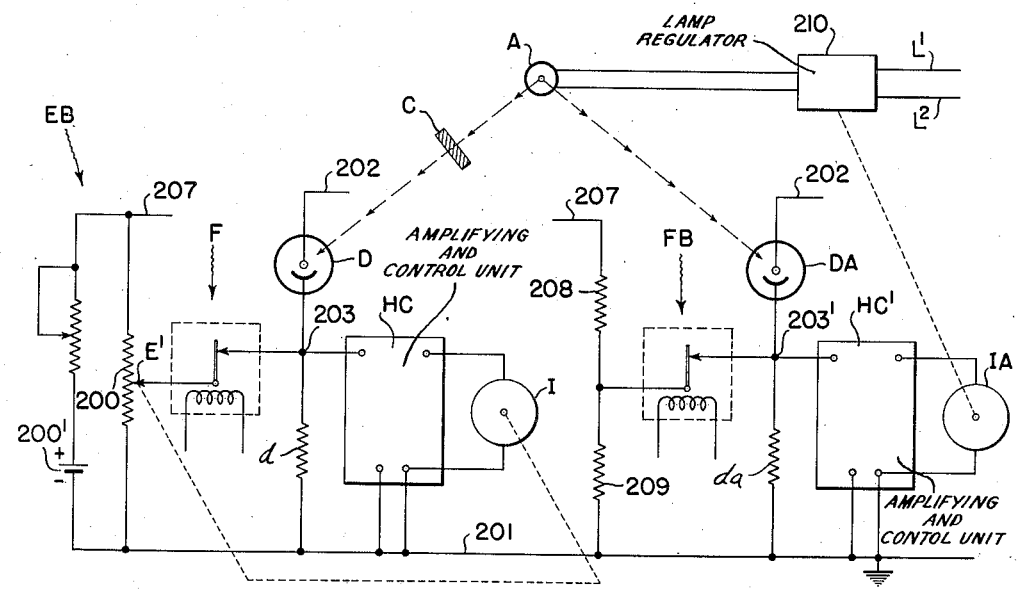
Fig. 7 is a diagram illustrating a modification of the apparatus shown in Fig. 1, including means for regulating the intensity of the ultra-violet light source.

In Fig. 7, I have illustrated an arrangement in which apparatus of the character shown in Fig. 4 is combined with apparatus including a second photocell DA and associated amplifying and control apparatus HC' and IA for regulating the intensity of the light emitted by the light source A which illuminates both photocells. The left hand portion of the apparatus shown in Fig. 7 may be identical with the apparatus shown in Fig. 4. As diagrammatically shown, however, the cathode of the photocell D is connected directly to a terminal of an amplifying and control unit HC through which the operation of the motor I is adjusted.

The amplifying and control unit HC may include a tube like the tube PA of Fig. 4. In Fig. 7, the positive end of the slide wire resistor 200 of the measuring circuit EB, is connected by a conductor 207 through resistors 208 and 209 to the grounded conductor 201. The junction point of the resistors 208 and 209 is connected to one terminal of a converter FB, which may be exactly like the converter F, and has its second terminal connected to the junction point 203' through which the cathode of the photocell DA is connected to the associated resistor da of high resistance, and is thereby connected to the grounded conductor 201. The junction point 203' is connected to one input terminal, and the grounded conductor 201 is connected to the second input terminal, of an amplifying and control unit HC' which may be exactly like the unit HC. The unit HC' controls the operation of the motor IA which is employed to adjust a regulator 210 in the energizing circuit of the lamp A. The lamp A transmits light directly to the cathode of the photocell DA and transmits light to the cathode of the photocell D through such an absorption cell C as is shown in Fig. 1.

The photocell DA operates through the motor IA on the regulator 210 in a manner tending to maintain the intensity of light emitted by the lamp A constant at the value at which the potential of the point 203' is equal to the potential of the junction of the resistances 208 and 209. On a decrease in the amount of light passed by the lamp A to the photocell DA and the resultant decrease in the potential of the point 203', the motor IA adjust the regulator 210 in the direction to increase the intensity of the light emitted by the lamp A. Conversely, on an increase in the potential of the point 203, the motor IA adjusts the regulator 210 to reduce the intensity of light emission. The photoelectric cell DA of Fig. 7 thus operates to avoid inaccuracies due to variations in the light output of the lamp A, in the measurements made by the apparatus comprising the photoelectric cell D, measuring circuit EB and motor I.

Figure 8:
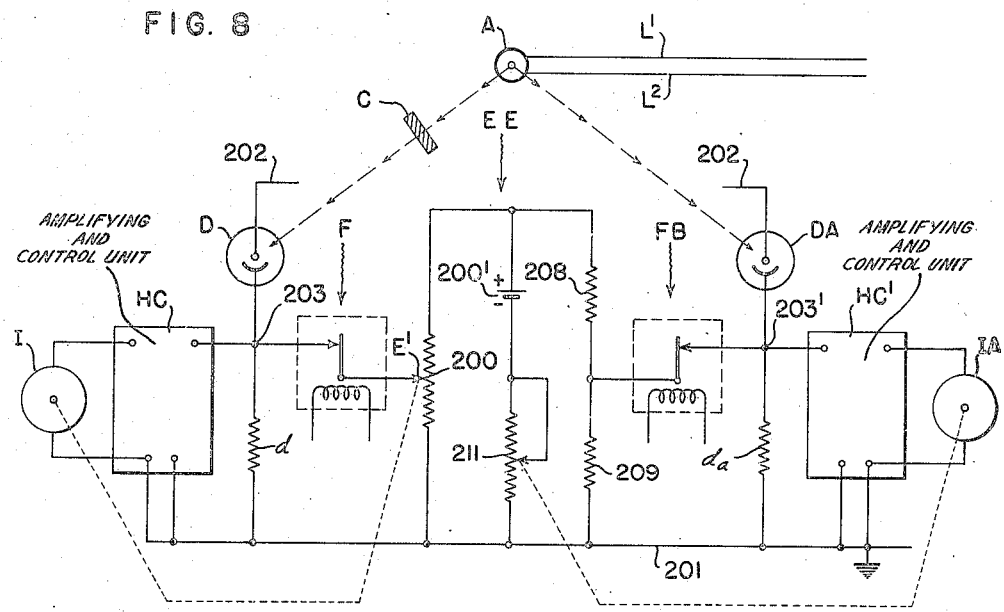
Fig. 8 is a diagram illustrating a modification of the apparatus shown in Fig. 1, including potentiometric means for automatically compensating for the effect of variations in the light intensity of the source of ultra-violet light.

In Fig. 8, I have illustrated a modification of the apparatus shown in Fig. 7, in which the resistances 208 and 209 are included in one branch of a split potentiometer measuring circuit EE characterized by the fact that a resistance 211 in its energizing branch is automatically adjusted by the motor IA to compensate for variations in the intensity of the light emitted by the lamp A. The overall measuring results obtained with the apparatus shown in Figs. 7 and 8 are substantially the same, but in Fig. 7, the motor IA operates to keep the illumination effect of the lamp A at a constant valve, while in Fig. 8 the motor IA adjusts the potential drop in the main slide wire resistance 200 of the measuring circuit to compensate for the effect of variations in the light output of the lamp A.

The apparatus in the preferred form diagrammatically illustrated in Figs. 2 and 3, is especially well adapted for use in an oil refinery or other industrial plant because it does not include storage or "B" batteries, which are customarily employed in laboratory measurements of minute currents but are not suitable for industrial use. By using high resistor units each of not more than 50 or 100 megohms, I avoid difficulties experienced with resistors of much higher ohmic values, for instance, 2,000 megohms, when used under conditions in which they are exposed to the deteriorating effect of ammoniacal vapors and atmospheres of high relative humidity. It is practically feasible to make the box M in which the resistors of high ohmic values and the electrometer tube are mounted, of metal of sufficient strength and rigidity to withstand unfavorable vibration conditions. The low voltage operation of the electrometer tube P and its relatively simple and rugged construction respectively contribute to infrequent need for the replacement of the tube, and to ease in effecting such replacement when necessary. The tubes U, V and W of Fig. 3 are rugged and so constructed as to make it simple and easy to replace them when replacement is necessary.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. The method of measuring a minute unidirectional current flowing in a circuit including a high resistance portion in which said current produces a measurable potential drop, which consists in maintaining a regulable unidirectional potential drop in a low resistance measuring circuit which is normally equal to the potential drop in said high resistance portion, and maintaining a pulsating voltage proportional to the difference between said potential drops when they are unequal, and impressing said pulsating voltage on the input circuit of an electronic amplifier and varying said regulable potential drop in accordance with variations in the output current of said amplifier to eliminate the difference between said potential drops.

2. The method of measuring a minute unidirectional current flowing in a circuit including a high resistance portion in which said current produces a measurable potential drop, which consists in maintaining a regulable, unidirectional, potential drop in a low resistance measuring circuit which is normally equal to the potential drop in said high resistance portion, alternately connecting and disconnecting points, one in each circuit, which are or are not at the same potential, accordingly as said potential drops are equal or unequal and thereby creating a pulsating potential when said drops are unequal, and impressing said pulsating potential on the input circuit of an electronic amplifier and varying said regulable potential drop in accordance with variations in the output current of said amplifier to eliminate the difference between said potential drops.

3. The method of measuring a minute unidirectional current flowing in a circuit including a high resistance portion in which said current produces a measurable potential drop, which consists in maintaining a regulable, unidirectional, potential drop in a low resistance measuring circuit which is normally equal to the potential drop in said high resistance portion, alternately connecting and disconnecting points, one in each circuit, which are or are not at the same potential, accordingly as said potential drops are equal or unequal and thereby creating a pulsating potential when said drops are unequal, and impressing said pulsating potential on the input circuit of a thermionic triode, operating said triode with a plate circuit voltage and a cathode temperature each substantially lower than the standard plate circuit voltage and cathode temperature for said triode, amplifying the output current of said triode and varying said regulable potential drop in accordance with variations in the amplified output current.

4. The method of measuring a minute unidirectional current flowing in a circuit including a high resistance portion in which said current produces a measurable potential drop, which consists in maintaining a regulable unidirectional potential drop in a low resistance measuring circuit which is normally equal to the potential drop in said high resistance portion and when said potential drops are unequal, impressing on the input circuit of an electronic amplifier an alternating voltage proportional to the difference between said potential drops and of predetermined frequency and of a phase dependent on which of said potential drops is the larger and varying said regulable potential drop in accordance with variations in the magnitude and phase of the output current of said amplifier to eliminate the said difference between said potential drops.

5. The method of measuring the light transmission to a photoelectric cell, which consists in passing a unidirectional electric current in series through said photoelectric cell and a high resistance, maintaining an adjustable measuring circuit potential drop normally equal to the potential drop in said high resistance, converting the difference between the two potential drops into a pulsating voltage, impressing the pulsating voltage on the input circuit of the first electronic valve of a multistage amplifying system, supplying a relatively low unidirectional voltage to the plate circuit of said valve and subjecting the cathode of said valve to a heating effect which is relatively low and so related to the relatively low plate circuit voltage that the voltage of the anode of said valve will remain practically constant notwithstanding appreciable variations in the voltage supplied to said plate circuit and maintaining the current flow through said photoelectric cell and high resistance practically independent of line voltage variations by connecting the circuit including said photoelectric cell and said high resistance in parallel with said first valve, and utilizing the output current of said amplifier to regulate said measuring circuit.

6. The method of measuring a minute unidirectional current flowing in a circuit including a high resistance in which said current produces a measurable potential drop which consists in maintaining a regulable unidirectional potential drop in a low resistance measuring circuit which is normally equal to the potential drop in said high resistance, and when they are unequal, utilizing alternating current to maintain a pulsating voltage of the same frequency as said alternating current and of a phase selectively dependent on which of two potential drops is the larger, impressing said pulsating voltage on the input circuit of an electronic amplifier and varying said regulable potential drop in accordance with variations in the magnitude and phase of the output current of said amplifier so as to eliminate said difference in the potential drops.

7. Apparatus for measuring a minute unidirectional current comprising a circuit through which said current flows and including a high resistance portion in which said current produces a measurable potential drop, a low resistance measuring portion adjustable to maintain a potential drop therein equal in magnitude to the first mentioned potential drop, a circuit connection including a circuit interrupter connecting points, one in each of said circuit portions, which are or are not at the same potential accordingly as said potential drops are equal or unequal, said interrupter being operable to open and close said connection in rapid alternation and thereby create a pulsating potential which is proportional to the difference between the two potential drops, an electronic amplifier having an input circuit and an output circuit, circuit connections through which said pulsating potential is impressed on said input circuit, and means connected to said output circuit and thereby actuated to adjust said measuring portion as required to eliminate differences in magnitude between said potential drops.

8. Apparatus for measuring a minute unidirectional current comprising a circuit through which said current flows and including a high resistance circuit portion in which said current produces a measurable potential drop, a low resistance circuit portion adjustable to maintain a potential drop therein equal in magnitude to the first mentioned potential drop, a direct connection between one end of said high resistance circuit portion and one end of said low resistance circuit portion, a circuit interrupter having a movable contact member and a pair of relatively stationary contact members adapted to be alternately engaged by said movable contact member, said relatively stationary contact members being connected respectively to points, one in each of said circuit portions, which are or are not at the same potential accordingly as said potential drops are equal or unequal, an electronic amplifier having an input circuit and an output circuit, said input circuit having a pair of terminals, one of which is capacitively connected to said movable contact member and the other of which is directly connected to one of said pair of relatively stationary contact members, said circuit interrupter being operable to produce a pulsating potential between said movable contact member and said one of said pair of relatively stationary contact members which is proportional to the difference between said potential drops, and means connected to said output circuit and thereby actuated to adjust said low resistance circuit portion as required to eliminate differences in magnitude between said potential drops.

9. Apparatus as specified in claim 7, in which said amplifier comprises a plurality of stages and in which the first amplifier stage comprises an electrometer tube.

10. Apparatus as specified in claim 7, in which said amplifier comprises a plurality of stages and in which the first stage comprises a triode valve, and in which said apparatus comprises means for supplying substantially lower energizing voltage to the plate circuit of the valve and for heating the cathode of the valve to a substantially lower temperature than the normal plate current voltage and cathode temperature for such a triode valve.

11. The method of measuring a minute unidirectional current flowing in a circuit including a high resistance portion in which said current produces a measurable potential drop, which consists in maintaining a unidirectional potential drop in a regulable portion of a low resistance measuring circuit portion, maintaining one end of said regulable portion and one end of the first mentioned portion at the same potential, alternately connecting and disconnecting the second ends of the two portions in rapid alternation and thereby creating a pulsating potential porportional to the difference in the potentials of the last mentioned portion ends when those potentials are unequal, amplifying said pulsating potential to produce a controlling alternating current and regulating said regulable portion in accordance with the last mentioned current to eliminate said potential difference.

12. Apparatus for measuring a minute unidirectional current comprising a circuit through which said current flows and including a high resistance portion in which said current produces a measurable potential drop, a low resistance measuring circuit portion connected at one end to one end of the first mentioned portion and adjustable to regulate the potential drop therein, a circuit interrupter connected between the second ends of the two circuit portions and operating to rapidly make and break a circuit connection between said second ends to thereby create a pulsating potential when the potentials of said second ends are unequal, an amplifier having an input circuit, and an output circuit, means through which said pulsating potential is impressed on said input circuit and means connected to said output circuit and thereby actuated to adjust the regulable portion of said measuring circuit as required to equalize the potentials of said second ends when those potentials are unequal.

13. Apparatus for measuring a minute unidirectional current comprising a circuit through which said current flows and including a high resistance portion in which said current produces a measurable potential drop, a low resistance measuring portion including engaging and relatively adjustable slide wire and contact elements which are normally adjusted to maintain a potential drop in the portion of said slide wire at one side of said contact equal in magnitude to the first mentioned potential drop, a circuit connection including a circuit interrupter connecting points, one in each of said circuit portions, which are or are not at the same potential accordingly as said potential drops are equal or unequal, said interrupter being operable to open and close said connection in rapid alternation and thereby create a pulsating potential which is proportional to the difference between the two potential drops, an electronic amplifier having an input circuit and an output circuit, circuit connections through which said pulsating potential is impressed on said input circuit, and means connected to said output circuit and thereby actuated to relatively adjust said elements as required to eliminate differences in magnitude between said potential drops.

14. In the operation of a triode valve of standard type as an electrometer tube responding to a minute current signal, the method which consists in heating the cathode of the valve and supplying energizing voltage to the plate circuit of the valve to maintain the cathode temperature and plate voltage of the valve substantially lower than the plate voltage and cathode temperature respectively maintained in the use of the valve for ordinary amplification purposes.

15. An electrometer comprising a triode having a high resistance input circuit, an output circuit, and a cathode heater, means for impressing a pulsating signal on said input circuit and means for supplying plate voltage to said output circuit and heating current to said heater respectively lower than the plate voltage and heating current normally supplied to such a triode.

16. An electrometer comprising a triode, a cathode bias resistor, a high resistance connecting the control grid of the triode to the cathode through the first mentioned resistor, a condenser having one terminal connected to said control grid, means for transmitting to the second terminal of said condenser rapidly recurring potential pulses, a cathode heater and means supplying plate voltage to the plate of said triode and heating current to its said heater respectively smaller than the plate voltage and cathode heater current normally supplied to such a triode.

17. In combination a thermionic valve having an anode, a cathode, a control grid and a cathode heater, a pair of supply conductors, said supply conductors being adapted to supply a relatively low plate voltage to said valve and a relatively low heating current to said heater so that on a fluctuation in the supply voltage the potential difference between said anode and said cathode will remain approximately constant as the potential difference between said supply conductors decreases and increases, a photoelectric cell having an anode and a cathode, a high resistance connecting the photocell cathode to said cathode, conductor means connecting the anode of the photocell to the anode of said valve and conductor means connecting the cathode of the photocell to the control grid of said valve.

18. In combination a thermionic valve having an anode, a cathode, a control grid and a cathode heater, a pair of supply conductors, means having input terminals connected to said supply conductors and having output terminals, one of which output terminals is connected to said cathode, a resistance through which a second output terminal is connected to said anode, said supply conductors being adapted to supply through said means a relatively low plate voltage to said valve and a relatively low heating current to said heater so that on a fluctuation in the supply voltage the potential difference between said anode and said one output terminal will decrease or increase as the potential difference between said supply conductors respectively increases or decreases, a photoelectric cell having an anode and a cathode, a high resistance connecting the photocell cathode to said one output terminal, conductor means connecting the anode of the photocell to the anode of said valve and to the first mentioned resistance at a point intermediate the ends of the latter and conductor means connecting the cathode of the photocell to the control grid of said valve.

19. In combination a thermionic valve having an anode, a cathode, a control grid and a cathode heater, a pair of supply conductors, means having input terminals connected to said supply conductors and having output terminals one of which output terminals is connected to said cathode, a resistance through which a second output terminal is connected to said anode, said supply conductors being adapted to supply through said means a relatively low plate voltage to said valve and a relatively low heating current to said heater so that on a fluctuation in the supply voltage the potential difference between said anode and said one terminal will decrease or increase as the potential difference between said supply conductors respectively increases or decreases, a photoelectric cell having an anode and a cathode, a high resistance connecting the photocell cathode to said one output terminal, conductor means connecting the anode of the photocell to the anode of said valve and to the first mentioned resistance at a point adjustable along the length of the latter and conductor means connecting the cathode of the photocell to the control grid of said valve.

20. Apparatus for amplifying a minute signal comprising two thermionic electrometer valves each having an anode, a cathode, a control grid and a cathode heating filament, circuit connections to said valves forming an input circuit for one of said valves on which said signal is impressed and forming an output circuit for that valve coupled to the input circuit of the other valve, a rectifier having output terminals to which said filaments are connected in parallel with one another, a resistance connected in parallel with said filaments between said input terminals and having a center tap ground connection to prevent ripples in the filament current.

21. Apparatus for amplifying a minute signal comprising an electrometer triode valve of standard type having an anode, a cathode and a control grid, circuit connections to said anode, cathode and control grid forming an input circuit on which said signal is impressed and an output circuit adapted to be coupled to the input circuit of an electronic amplifying system, means for supplying plate current voltage to said valve comprising a supply conductor at a potential subject to variations independent of the magnitude of the plate current in said valve, a resistance through which said conductor is connected to the anode of said valve to maintain a potential difference between the anode and cathode of said valve substantially smaller than the normal plate and cathode potential difference of such a valve, and means for maintaining the cathode of said valve at a temperature which increases and decreases as said conductor voltage increases and decreases but which is substantially lower than normal cathode temperature for such a valve, whereby the effect on the anode potential of said valve of a change in the voltage of said supply conductor is substantially reduced by the effect of the potential drop in said resistance and corresponding changes in the temperature and electron emission of the cathode.

22. Apparatus for amplifying a minute signal comprising two thermionic electrometer valves each having an anode, a cathode and a control grid, circuit connections to said anodes, cathodes and control grids forming an input circuit to one of said valves on which said signal is impressed and an output circuit for that valve coupled to the input circuit of the other valve, means for supplying plate current voltage to each valve comprising a supply conductor at a potential subject to variation independent of the plate current magnitudes, a resistance through which said conductor is connected to the anode of each valve to maintain a potential difference between the anode and cathode of each valve substantially lower than is normal for such a valve, and means for maintaining the cathodes of said valves at temperatures which increase and decrease as said conductor voltage increases and decreases and are substantially lower than the normal cathode temperature for such valves, whereby the effect on the anode potential of each valve of a change in the voltage of said supply conductor is substantially reduced by the effect of the potential drop in the resistance connected to the anode of the valve and by the corresponding change in the temperature and electron emission of the cathode of the valve.

23. In apparatus for measuring a minute unidirectional current comprising a circuit through which said current flows and including a high resistance portion in which said current produces a measurable potential drop, an electrometer comprising a triode having an input circuit including a high resistance and having an output circuit and a cathode heater, means responsive to variations in said potential drop for impressing a pulsating signal proportional to said variations on said input circuit and means for supplying plate voltage to said output circuit and heating current to said heater respectively smaller than the plate voltage and heating current normally supplied to such a triode.

24. In apparatus for measuring a minute unidirectional current comprising a circuit through which said current flows and including a high resistance portion in which said current produces a potential drop, an electrometer comprising a triode having an input circuit and an output circuit, a cathode bias resistor in said output circuit, a high resistance connecting the control grid of the triode to the cathode through the first mentioned resistor, a condenser having one terminal connected to said control grid, means responsive to variations in said potential drop for transmitting to the second terminal of said condenser potential pulses proportional in magnitude to said potential drop, a cathode heater and means supplying plate voltage to said output circuit and heating current to said heater respectively smaller than the plate voltage and heater current normally supplied to such a triode.

25. Apparatus for measuring a minute unidirectional current comprising a circuit through which said current flows and including a high resistance portion in which said current produces a measurable potential drop and a low resistance measuring portion which is adjustable to maintain a potential drop therein equal in magnitude to the first mentioned potential drop, each of said portions having one end connected to one end of the other, means intermittently connecting the second ends of said portions, said means comprising a contact connected to one of said second ends, a vibratile element connected to the other of said second ends and alternately engaging and disengaging said contact when vibrated and means for vibrating said vibratile element at a predetermined frequency, a ground connection to said vibratile element and a voltage responsive device connected to said contact.

26. Apparatus for measuring a minute unidirectional current comprising a circuit through which said current flows and including a high resistance portion in which said current produces a measurable potential drop and a low resistance measuring portion which is adjustable to maintain a potential drop therein equal in magnitude to the first mentioned potential drop, each of said portions having one end connected to one end of the other, means intermittently connecting the second ends of said portions, said means comprising a contact connected to one of said second ends, a vibratile element connected to the other of said second ends and alternately engaging and disengaging said contact when vibrated, said vibratile element having a natural vibration period of seventy-three vibrations per second, and means for vibrating said element at a frequency of sixty vibrations per second, said last mentioned means comprising an electromagnetic coil energized with an alternating current having a difference of potential of three volts and a frequency of sixty cycles per second.

27. Apparatus for measuring a minute electric current comprising in combination a preamplifier and a main amplifier each comprising one or more thermionic valves having an anode, a cathode and a control grid for successively amplifying a minute signal impressed on said preamplifier, said cathodes being connected to ground, a rectifier having one output terminal connected to ground, means including a potentiometer resistance through which the second output terminal of the rectifier is connected to said anodes to supply successively higher plate voltages to the respective valves by which said signal is successively amplified and a decoupler connection between said potentiometer and each preamplifier anode comprising a resistance connected to ground and a by-pass condenser in shunt with said resistance and operating to minimize the effect on the operation of the preamplifier of plate current changes in the main amplifier.

28. Apparatus comprising a multistage electronic amplifying and motor drive system for successively amplifying an alternating current signal comprising a series of valves, each of which has an anode, a cathode, and a control grid, ground connections through which said cathodes are each connected to ground, a rectifier having one output terminal connected to ground, a potentiometer resistance through which said anodes are connected to the second output terminal of the rectifier so that the valves in which said signal is successively amplified receive successively higher plate voltages, a separate condenser through which the control grid of each of said valves except the first of the series is connected to the anode of the preceding valve in the series, an adjustable resistance through which the control grid of one of said valves is respectively connected to ground and to the condenser through which said grid is connected to the anode of the preceding valve in the series, grid rectification providing bias voltage for the control grid of said one valve, and means to limit said bias voltage.

29. Measuring apparatus comprising a multistage electronic amplifying and motor drive system for successively amplifying an alternating current signal comprising a series of valves, each of which has an anode, a cathode, and a control grid, ground connections through which said cathodes are each connected to ground, a rectifier having one output terminal connected to ground, a potentiometer resistance through which said anodes are connected to the second output terminal of the rectifier so that the valves in which said signal is successively amplified receive successively higher plate voltages, a separate condenser through which the control grid of each of said valves except the first in the series is connected to the anode of the preceding valve in the series, an adjustable resistance through which the control grid of one of said valves is respectively connected to ground and to the condenser through which said grid is connected to the anode of the preceding valve in the series, grid rectification providing bias voltage for the control grid of said one valve, and an additional resistance through which the control grid of said one valve is connected to ground to limit said bias voltage.

30. Measuring apparatus comprising a multistage electronic amplifying and motor drive system for successively amplifying an alternating current signal in a relatively high impedance circuit, each stage including a valve having an anode, a cathode and a control grid, ground connections through which said cathodes are each connected to ground, a rectifier having one output terminal connected to ground, a potentiometer resistance through which said anodes are connected to the second output terminal of the rectifier so that the valves in which said signal is successively amplified receive successively higher plate voltages, a separate condenser through which the control grid of each of said valves except the first in the series is connected to the anode of the preceding valve in the series, the connection between the control grid of one of said valves and the condenser connected to the anode of the preceding valve in the series comprising a potentiometric resistance directly connecting said condenser to ground and a slider contact connected to the last mentioned control grid and engaging and adjusted along the last mentioned resistance, and an additional condenser which directly connects to ground the said anode connected to ground through a condenser and potentiometric resistance.

31. Measuring apparatus comprising a multistage electronic amplifying and motor drive system for successively amplifying an alternating current of relatively low frequency in a relatively high impedance circuit, each stage including a valve having an anode, a cathode and a control grid, ground connections through which said cathodes are each connected to ground, a rectifier having one output terminal connected to ground, a potentiometer resistance through which said anodes are connected to the second output terminal of the rectifier so that the valves in which said signal is successively amplified receive successively higher plate voltages, a separate condenser through which the control grid of each of said valves except the first in the series is connected to the anode of the preceding valves in the series, one of the valves in the series having an output circuit offering relatively high impedance to ground for a current flow of said relatively low frequency, and offering a relatively low impedance to ground for relatively high frequency currents which self oscillation in said system tend to produce.

32. Measuring apparatus comprising a measuring circuit including a light sensitive device adapted to detect changes in the light absorption of a substance, a source of illumination adapted to illuminate said light sensitive device through the substance, a second light sensitive device directly illuminated by said source of illumination, and means controlled by said second light sensitive device to compensate for changes in the intensity of illumination of said source, said means comprising a multistage electronic amplifying and motor drive system having an input circuit including said second light sensitive device and having a driving motor, and means adjusted by said driving motor to vary the intensity of illumination of said source.

33. Measuring apparatus comprising a measuring circuit including a light sensitive device adapted to detect changes in the light absorption of a substance, a source of illumination adapted to illuminate said light sensitive device through the substance, a second light sensitive device directly illuminated by said source of illumination, and means controlled by said second light sensitive device to compensate for changes in the intensity of illumination of said source, said means comprising a multistage electronic amplifying and motor drive system having an input circuit including said second light sensitive device and having a driving motor, and means adjusted by said driving motor to effect compensation for changes in the intensity of illumination of said source, said last mentioned means comprising an adjustable resistance portion of said measuring circuit.

34. Measuring apparatus comprising a measuring circuit including a light sensitive device adapted to detect changes in the light absorption of a substance, a source of illumination adapted to illuminate said light sensitive device through the substance, a second light sensitive device directly illuminated by said source of illumination, and means controlled by said second light sensitive device to compensate for changes in the intensity of illumination of said source, said means comprising a multistage electronic amplifying and motor drive system having an input circuit including said second light sensitive device and having a driving motor, and means adjusted by said driving motor to effect compensation for changes in the intensity of illumination of said source.

35. Measuring apparatus comprising a measuring circuit including a light sensitive device adapted to detect changes in the light absorption of a substance, a source of illumination adapted to illuminate said light sensitive device through the substance, a second light sensitive device directly illuminated by said source of illumination, and means independent of said first mentioned light sensitive device and controlled by said second light sensitive device to compensate for changes in the intensity of illumination of said source.

LEONARD STANTON.

REFERENCES CITED

The following references are of record in the file of this patent:

UNITED STATES PATENTS

| Number | Name | Date |
| --- | --- | --- |
| 1,930,541 | Shoup | Oct. 17, 1933 |
| 1,960,097 | Barnard et al. | May 22, 1934 |
| 2,104,428 | Lassiter | Jan. 4, 1938 |
| 2,113,164 | Williams Jr. | Apr. 5, 1938 |
| 2,124,684 | Behr et al. | July 26, 1938 |
| 2,139,489 | Cockrell | Dec. 6, 1938 |
| 2,149,361 | Rath | Mar. 7, 1939 |
| 2,150,006 | Parker et al. | Mar. 7, 1939 |
| 2,187,613 | Nichols | Jan. 16, 1940 |
| 2,216,472 | Harrison | Oct. 1, 1940 |
| 2,228,868 | Briebrecher | Jan. 14, 1941 |
| 2,245,124 | Bonn | June 10, 1941 |
| 2,275,930 | Torcheux | Mar. 10, 1942 |
| 2,297,543 | Eberhardt et al. | Sept. 29, 1942 |
| 2,355,537 | Jones | Aug. 8, 1944 |
| 2,411,362 | Boykin | Nov. 19, 1946 |